United States Patent
Dupoiron et al.

(10) Patent No.: US 7,784,498 B2
(45) Date of Patent: Aug. 31, 2010

(54) FLEXIBLE PIPELINE WITH MULTIPLE PIPES PROTECTED AGAINST CORROSION

(75) Inventors: Francois Dupoiron, Barentin (FR); Sébastien Jacquemin, La Celle Saint Cloud (FR)

(73) Assignee: Technip France (FR)

( * ) Notice: Subject to any disclaimer, the term of this patent is extended or adjusted under 35 U.S.C. 154(b) by 845 days.

(21) Appl. No.: 11/574,969

(22) PCT Filed: Aug. 25, 2005

(86) PCT No.: PCT/FR2005/002145

§ 371 (c)(1), (2), (4) Date: Mar. 8, 2007

(87) PCT Pub. No.: WO2006/030085

PCT Pub. Date: Mar. 23, 2006

(65) Prior Publication Data

US 2007/0227608 A1    Oct. 4, 2007

(30) Foreign Application Priority Data

Sep. 13, 2004  (FR) .................................... 0409684

(51) Int. Cl.
*F16L 11/00* (2006.01)
(52) U.S. Cl. ........................ 138/137; 138/133; 138/134; 138/114; 138/135
(58) Field of Classification Search ................ 138/137, 138/129, 133–135, 127, 140, 114; 405/158, 405/211.1
See application file for complete search history.

(56) References Cited

U.S. PATENT DOCUMENTS

| 4,688,828 | A | | 8/1987 | Shaffer | ........................ 285/45 |
| 4,765,711 | A | * | 8/1988 | Obst | ........................ 385/103 |
| 5,275,209 | A | * | 1/1994 | Sugier et al. | ................. 138/135 |
| 5,362,921 | A | * | 11/1994 | Birkelund et al. | ............. 174/47 |
| 5,472,614 | A | * | 12/1995 | Rossi | ........................ 210/646 |
| 6,012,495 | A | * | 1/2000 | Antonsen | ................... 138/131 |
| 6,689,231 | B1 | | 2/2004 | Kangas | ....................... 148/519 |
| 6,858,117 | B2 | * | 2/2005 | Berton et al. | ............ 204/196.2 |

FOREIGN PATENT DOCUMENTS

| FR | 2 752 908 A | 3/1998 |
| FR | 2 782 142 A | 2/2000 |
| GB | 2 351 301 A | 12/2000 |

OTHER PUBLICATIONS

International Search Report PCT/FR2005/002145 dated Dec. 6, 2005.

* cited by examiner

*Primary Examiner*—Patrick F Brinson
(74) *Attorney, Agent, or Firm*—Ostrolenk Faber LLP

(57) ABSTRACT

A flexible pipeline with multiple pipes, adapted for hydrocarbon transport, the pipeline comprising a flexible core element inside which flows hydrocarbon, an outer sheath around the flexible core element and at least one peripheral steel alloy pipe extending longitudinally in an annular space located between the outer sheath and the flexible core element, the annular space further comprising metal elements in contact with an aqueous medium containing oxygen and the metal elements is susceptible to being oxidized by fixing oxygen. The oxidizable metal elements and is peripheral pipe are maintained mutually spaced apart to be electrically decoupled.

10 Claims, 1 Drawing Sheet

FLEXIBLE PIPELINE WITH MULTIPLE PIPES PROTECTED AGAINST CORROSION

CROSS REFERENCE TO RELATED APPLICATION

Figure 1:
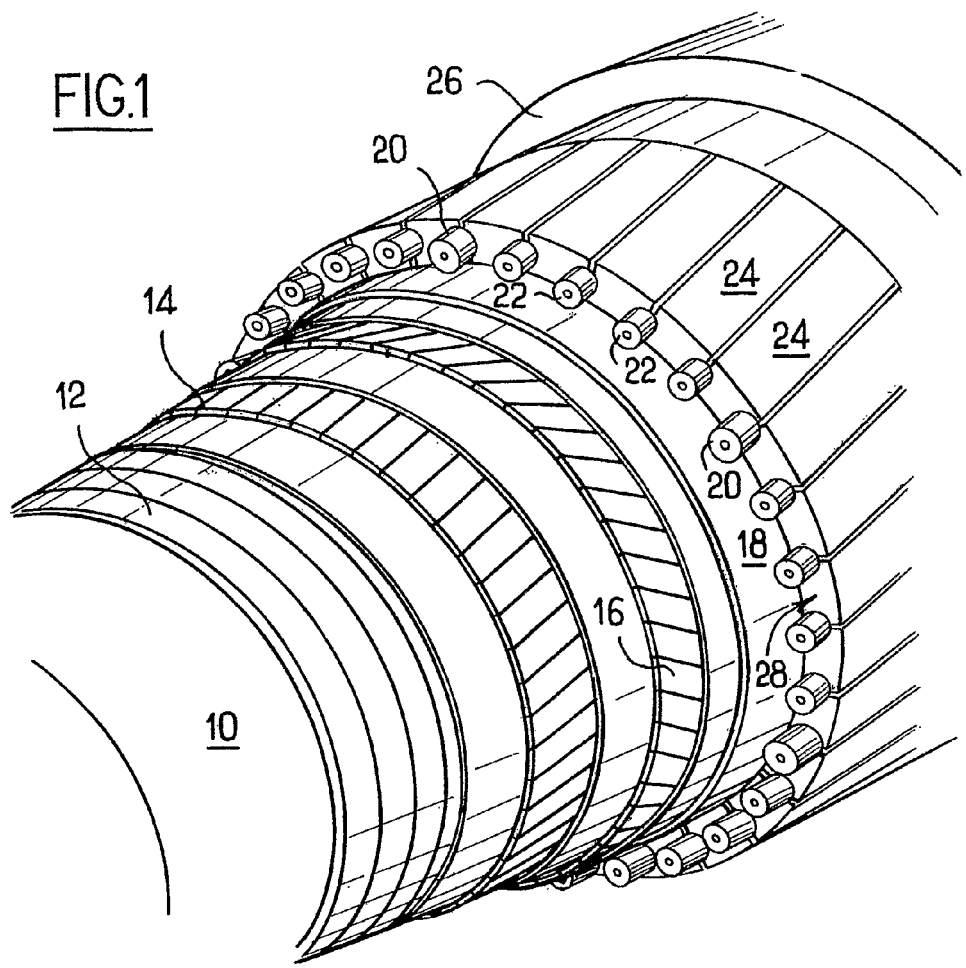

The present application is a 35 U.S.C. §§371 national phase conversion of PCT/FR2005/0002145, filed 25 Aug. 2005, which claims priority of French Application No. 0409684, filed 13 Sep. 2004. The PCT International Application was published in the French language.

BACKGROUND OF THE INVENTION

The present invention relates to multi-pipe flexible flowlines and especially to improvements for preserving certain secondary pipes from corrosion.

These flexible flowlines are intended for the subsea transport of hydrocarbons and comprise in particular a central flexible element, or main pipe, in which said hydrocarbon can flow, and peripheral secondary pipes, the whole assembly being housed inside a flexible external sheath. An annular space between the central flexible element and the external sheath is designed to house the peripheral secondary pipes. These peripheral pipes, made of alloy steel or passivatable metal, extend longitudinally in the annular space, either helically around the central flexible element or sinusoidally around a generatrix of the flowline, more commonly called S/Z, so as to allow these flowlines to bend.

These pipes are designed to transport fluids, for example pressurized gas, between the two ends of a subsea flowline, for example one located at the surface of a platform and the other located near the seabed. In general, this pressurized gas is conveyed from the platform to the seabed in order to be injected into the wellhead so as to make it easier for crude to rise (called "gas lift").

However, the peripheral pipes are liable to be degraded by corrosion, the more so as seawater, which may contain oxygen, generally circulates within the annular space. Consequently owing to the pressure that is exerted on said pipes, the peripheral pipes may over time become perforated. To overcome this, it has already been imagined to electrochemically preserve the peripheral steel pipes by cathodic protection, by electrically coupling them to sacrificial anodes of the zinc or aluminum type.

The reader may in particular refer to document FR 2 752 908 which describes such a protection device.

However, this type of protection can prove to be insufficient owing to the very high confinement of this annulus and/or can result in the production of hydrogen, which is liable to cause serious embrittlement, called hydrogen embrittlement, in particular in the case of the peripheral pipes made of high-grade stainless steel.

SUMMARY OF THE INVENTION

One object of the present invention is therefore to provide a flexible flowline having peripheral pipes made of alloy steel or a passivatable metal alloy that are preserved not only from generalized corrosion but also from hydrogen embrittlement.

For this purpose, the present invention proposes a multi-pipe flexible flowline designed to transport hydrocarbons, said flowline comprising a central flexible element inside which said hydrocarbon flows, an external sheath around said central flexible element and at least one peripheral pipe made of alloy steel or a passivatable metal alloy that extends longitudinally in an annular space lying between said external sheath and said central flexible element, said annular space further including metal elements in contact with an oxygen-containing aqueous medium, said metal elements being oxidizable, thus fixing the oxygen. According to the invention, said oxidizable metal elements and said peripheral pipe are kept spaced apart from each other so as to be electrically decoupled.

Thus, one feature of the invention lies in the use of oxidizable metal elements in the annulus of the flowline that are not coupled to the peripheral pipes but spaced apart so as to consume the oxygen present in the annulus, by corroding, and not to shift the corrosion potential of the peripheral pipes made of steel or passivatable metal alloy. In this way, by lowering the oxygen concentration of the aqueous medium that circulates in the annulus, the corrosion rate of the pipes made of steel or passivatable metal alloy is considerably reduced.

According to one particularly advantageous embodiment of the invention, the flexible flowline includes at least one pair of keepers which is installed longitudinally in said annular space, said keepers having two opposed bearing faces, which are designed to bear against the central flexible element and against said external sheath respectively, and concave lateral surfaces, said pair of keepers being designed to keep said peripheral pipe between two facing lateral surfaces and spaced apart from both said central flexible element and said external sheath.

Thus, the pairs of keepers are designed to keep the peripheral pipes in fixed positions. Preferably, a plurality of keepers and peripheral pipes extends longitudinally in the annular space over its entire circumference, the keepers and pipes bearing respectively against one another along tangential directions.

In this way, keepers and peripheral pipes are entirely locked together over the circumference of the annulus and advantageously said metal elements are fastened to said keepers. Thus, the oxidizable metal elements are kept spaced apart from the peripheral pipes with no possibility of contact. Consequently, no electrical coupling is possible between the pipes and the metal elements, which nevertheless can oxidize and deplete the aqueous medium in the annulus of oxygen.

According to one particularly advantageous embodiment of the invention, said keepers have, between said bearing faces and said concave lateral surfaces, free projecting parts, said free projecting parts of a pair of keepers being designed to lie facing each other, and said oxidizable metal elements extend along said free projecting parts. Thus, a keeper has two free projecting parts on either side of one of these two concave lateral surfaces, and the two free projecting parts of one pair of keepers, between which a pipe lies, extend respectively facing each other on either side of said pipe. In this way, by installing the oxidizable metal elements along these free projecting parts, the aqueous medium is depleted of oxygen near the pipe, thereby allowing it to be even better preserved from corrosion.

Advantageously, said oxidizable metal elements have an anchoring part sunk into said bearing faces in such a way that the external sheath, which bears against said faces, jams the metal elements perfectly, said metal elements then being unable to move tangentially relevant to the flowline and cannot come into contact with the peripheral pipes.

According to another particularly advantageous embodiment of the invention, said oxidizable metal elements have grooves so as to increase the area of contact with the aqueous medium and thus increase the consumption of oxygen by corrosion. Preferably, said metal elements are made of steel so as to be able to be processed at an advantageous cost by the usual means needed to manufacture flexible flowlines.

Furthermore, said keepers are made in a plastic-type electrically insulating material, especially so as to prevent electrical coupling between the peripheral pipes and the metal elements if the peripheral pipes are not, however, covered with an insulating protective layer.

Other features and advantages of the invention will become apparent on reading the following description of particular embodiments of the invention, given by way of indication but implying no limitation, and with reference to the appended drawings.

Figure 2:
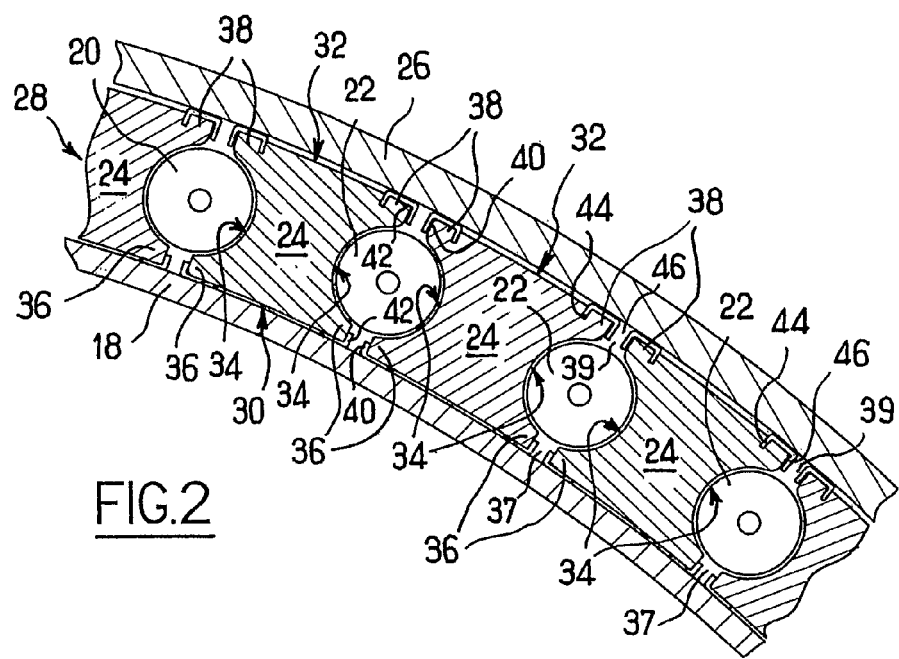

FIG. 1 is a partial schematic view in perspective, with partial cutaway, of a multi-pipe flexible flowline according to one embodiment of the invention; and FIG. 2 is a detailed sectional schematic view of elements shown in FIG. 1.

FIG. 1 shows, in part, a flexible flowline according to the invention, which is designed for the subsea transport of hydrocarbons and is generally installed between a surface installation and a seabed installation. It comprises, from the inside of the flowline outward:
- a sealing sleeve 10, which covers a metal carcass (not shown);
- a pressure vault 12;
- a ply of tensile armor layers, comprising two armor layers 14 and 16 wound crosswise in opposite directions with a substantially equivalent lay angle;
- an internal sealing sheath 18;
- a ply that will be explained in detail below, consisting of a plurality of heating cables 20 and peripheral pipes 22, which alternate with keepers 24, said keepers 24 forming compressive force transmission members; and
- an external sheath 26.

The aforementioned peripheral pipes 22 are designed to convey pressurized fluids from a surface installation to the seabed, for gas lift. These fluids, generally gases recovered from the hydrocarbon at the surface, are reinjected at the base of the pipe into the seabed so as to defragment and/or in particular entrain the plugs of wax that might have formed. The heating cables 20 themselves have the function of heating the hydrocarbon so as possibly to melt these wax plugs.

These pipes are installed longitudinally in the annular space 28 of the flowline, lying between the internal sealing sheath 18 and the external sheath 26, helically or sinusoidally, and are held in place, both spaced apart from each other and away from the internal sealing sheath 18 and the external sheath 26 respectively, thanks to the keepers 24 that will now be explained in detail with reference to FIG. 2. Moreover, the seawater penetrates into the annular space 28 so that the keepers 24 and the pipes are immersed in an aqueous medium liable to contain oxygen. Now, the peripheral pipes are made of stainless steel, optionally coated with a protective plastic layer, and are liable to corrode under the combined action of water and oxygen. Seawater containing sodium chloride and various other electrolytes is more conducting than fresh water and consequently the rate of diffusion of the chemical species to the surfaces is thereby increased, as is the rate of corrosion.

This FIG. 2 shows, in section, part of the annular space 28 of the flowline according to the invention and also the internal sealing sheath 18 and the external sheath 26 between which the keepers 24 and the peripheral pipes 22 lie.

Each of the keepers 24 is formed from a flexible member having two opposed bearing faces, namely a first face 30 that bears against the external surface of the internal sealing sheath 18 and a second face 32 that bears against the internal surface of the external sheath 26. It also has two opposed concave lateral surfaces 34 bordered by two respective free projecting parts, namely an internal free part 36 and an external free part 38.

The opposed concave lateral surfaces 34 form, in cross section, an arcuate portion having a length smaller than the semi-perimeter of the peripheral pipes 22, in such a way that any pair of keepers 24, which grips a peripheral pipe 22, advantageously has two internal free parts 36 and two external free parts 38 facing each other and spaced apart, on either side of said peripheral pipe. Said pair of keepers therefore defines two opposed interstices, namely an internal interstice 37 and an external interstice 39, into which interstices the water can flow.

Moreover, these keepers 24 are made of plastic, for example polyethylene or polyamide, so as in particular to withstand the compressive forces in order to be able to retransmit them. Moreover, they extend, alternately with a peripheral pipe 22, over the entire circumference of the annular space 28. Consequently, the pipes 22 and the keepers 24 are prevented from moving tangentially and radially with respect to one another.

According to an essential feature of the invention, oxidizable metal elements 40, 42 are installed around the free projecting parts 36, 38 of the keepers 24.

According to one particular embodiment, the oxidizable metal elements 40, 42 are formed from a metal U-section made of low-alloy steel, for example carbon steel. However, galvanized steel, zinc or aluminum are also very suitable. The metal section has two flanges, a first flange 44 sunk into the second bearing face 32 of the keepers 24, near the free projecting part 38, and a second flange 46 extending along this free projecting part 38 toward the peripheral pipe 22. Of course, this second flange 46 does not come into contact with the peripheral pipe, so as to avoid any electrical coupling.

Thus, the second flanges 46 of each of the sections 40, 42 of a pair of keepers 24 lie facing each in the interstice, near the pipe 22. The use of the sections 40, 42 has been described in the case of the external interstices 39 corresponding to the external free part 38, but it is strictly the same in respect of the internal free parts 36, and this will not be described again.

In this way the oxidizable metal elements formed from the sections 42, 40 are at least partly immersed in the water circulating in the interstices 37, 39, and are therefore oxidized owing to the oxygen dissolved in this water. Thus, the aqueous medium is depleted of oxygen, which consequently can no longer contribute to oxidizing other elements, and in particular the peripheral pipes.

According to one particular embodiment, the active area of these oxidizable metal elements is increased by making grooves in the surface of these elements. In this way the area that can react with oxygen is increased, without thereby increasing the overall dimensions of the metal elements.

Of course, the invention is not limited to oxidizable metal elements formed from sections. Thus, provision may be made for oxidizable metal strips to be fastened against the free projecting parts 38, 36 of the keepers 24 using fastening means screwed into these same keepers 24.

Here again, the metal strips will be kept away from the peripheral pipes 22 so as to avoid any contact, and therefore any electrical coupling.

Moreover, according to yet another embodiment, pipes around the periphery in the annulus may be regularly replaced, for example one every five, with oxidizable metal elements that allow oxygen to be trapped and cause remote oxygen diffusion between the adjacent keepers.

According to a final embodiment (not shown), instead of or in conjunction with the oxidizable metal elements 40, 42, a metal tape is wound around the keepers 24 in a short-pitch helix, said metal tape having two functions, namely to oxidize, thereby fixing the oxygen, and to facilitate the transfer of thermal energy supplied by the heating cables 20.

The invention claimed is:

1. A multi-pipe flexible flowline operable to transport hydrocarbons, said flowline comprising a central flexible element inside which said hydrocarbon flows, an external sheath around and spaced out from said central flexible element defining an annular space between said sheath and said flexible element, and at least one peripheral pipe of oxidizable material that extends longitudinally in said annular space lying between said external sheath and said central flexible element, metal elements in said annular space and in contact with an oxygen-containing aqueous medium, said metal elements being oxidizable, and thus operable for fixing the oxygen, said oxidizable metal elements and said peripheral pipe are kept spaced apart so as to be electrically decoupled.

2. The flexible flowline as claimed in claim 1, further comprising at least one pair of keepers which is installed in and extending longitudinally in said annular space, said keepers (24) having two opposed bearing faces, which bear against said central flexible element and against said external sheath respectively, and having concave lateral surfaces, said pair of keepers being operable to keep said peripheral pipe both between two facing said lateral surfaces and spaced apart from both said central flexible element and said external sheath.

3. The flexible flowline as claimed in claim 2, wherein said metal elements are fastened to said keepers.

4. The flexible flowline as claimed in claim 2, wherein said keepers have, between said bearing faces and said concave lateral surfaces, free projecting parts, and said free projecting parts of a pair of keepers lie facing each other, and said oxidizable metal elements extend along said free projecting parts.

5. The flexible flowline as claimed in claim 2, wherein said oxidizable metal elements include an anchoring part embedded in said bearing faces.

6. The flexible flowline as claimed in claim 2, wherein said oxidizable metal elements have grooves therein.

7. The flexible flowline as claimed in claim 2, wherein said oxidizable metal elements are made of steel.

8. The flexible flowline as claimed in claim 2, wherein said keepers are made in a plastic-type electrically insulating material.

9. The flexible flowline as claimed in claim 1, wherein said peripheral pipes are of alloy steel.

10. The flexible flowline as claimed in claim 1, further comprising keepers positioned and shaped to keep said peripheral pipe spaced apart from both said central flexible element and said external sheath.

\* \* \* \* \*